US005625788A

United States Patent [19]
Boggs et al.

[11] Patent Number: 5,625,788
[45] Date of Patent: Apr. 29, 1997

[54] MICROPROCESSOR WITH NOVEL INSTRUCTION FOR SIGNALING EVENT OCCURRENCE AND FOR PROVIDING EVENT HANDLING INFORMATION IN RESPONSE THERETO

[75] Inventors: Darrell D. Boggs, Aloha; Scott D. Rodgers, Hillsboro, both of Oreg.

[73] Assignee: Intel Corporation, Santa Clara, Calif.

[21] Appl. No.: 203,790

[22] Filed: Mar. 1, 1994

[51] Int. Cl.⁶ .................................. G06F 9/38; G06F 9/00
[52] U.S. Cl. ........................ 395/390; 395/391; 395/392
[58] Field of Search ................................ 395/375, 390, 395/391, 392

[56] References Cited

U.S. PATENT DOCUMENTS

| | | | |
|---|---|---|---|
| 4,722,049 | 1/1988 | Lahti | 395/375 |
| 4,773,041 | 9/1988 | Hassler | 395/421.03 |
| 5,193,158 | 3/1993 | Kinney et al. | 395/375 |
| 5,280,615 | 1/1994 | Church et al. | 395/650 |
| 5,404,470 | 4/1995 | Miyake | 395/375 |
| 5,420,991 | 5/1995 | Konigsfeld et al. | 395/375 |

OTHER PUBLICATIONS

Sohi; "Instruction Issue Logic for High-Performance, Interruptible, Multiple Functional Unit Pipelined Computers" IEEE Transactions on Computer. vol. 39, N-3, Mar. 1990.

Smith; "Implementing Precise Interrupts In Pipelined Processors" IEEE Transactions on Computers, vol. 37, N-5, May 1988.

Wang et al. "Implementing Precise Interruptions In Pipelined RISC Processors". IEEE Micro Aug. 1993, pp. 36-43.

Dwyer et al; "A Fast Instruction Dispatch Unit for Multiple and Out-of-Sequence Issuances", pp. 1-11, Figs. 1-8. EE-CEG-87-15.

"The Metaflow Architecture", pp. 10-13 and 63-73, by Val Popescu, Merle Schultz, John Spracklen, Gary Gibson, Bruce Lightner, and David Isaman, IEEE Micro, 1991.

*Primary Examiner*—Krisna Lim
*Attorney, Agent, or Firm*—Blakely, Sokoloff, Taylor & Zafman

[57] ABSTRACT

An out-of-order microprocessor signals event occurrence and provides event handling information utilizing a novel instruction issued to an execution unit upon detection of the condition giving rise to the event. Event information includes the type of event and characteristic information and data for use by a coded routine which handles the event. A reorder buffer stores this information to facilitate event handling actions and state updates. A retirement control circuit of the microprocessor includes a posting mechanism for use by the event handling routine.

16 Claims, 4 Drawing Sheets

FIG_1A

FIG_1B

FIG_2

MICROPROCESSOR WITH NOVEL INSTRUCTION FOR SIGNALING EVENT OCCURRENCE AND FOR PROVIDING EVENT HANDLING INFORMATION IN RESPONSE THERETO

BACKGROUND OF THE INVENTION

1. Field Of The Invention

This invention relates to programming operations in a microprocessor, and more specifically, to the signaling of events, including inter alia exceptions, assists, mispredicted branches and state updates, in microcode. The invention is particularly pertinent to speculative, out-of-order processors which predict program flow and execute instructions out-of-order, but may also be used in conventional pipelined and non-pipelined processors.

2. Art Background

I. Program Flow In Pipelined Processors

Simple microprocessors generally process instructions one at a time. Each instruction can be considered as being processed in five sequential stages: instruction fetch (IF), instruction decode (ID), operand fetch (OF), execute (EX), and writeback (WB). During instruction fetch, an instruction pointer from a program counter is sent to an instruction memory, such as an instruction cache, to retrieve an instruction. The instruction is decoded to obtain an opcode in addition to source and destination register addresses. During operand fetch, a register file is addressed with the source register addresses to return the return source operand values.

however, may or may not result in an instruction flow change, depending on the type of event.

One way in which an event may be generated is through the occurrence of a condition that causes an error in execution of the instruction and requires special macrocode routines to service the condition that was detected during execution. These type of events are referred to as exceptions. Exceptions include faults, traps and interrupts (both software and hardware). Another type of event is an assist, which is a condition detected during execution that requires a special microcode flow to be executed in order to "assist" the processor in handling the condition during its execution. Mispredicted branches are also classified as events. They occur through the execution of conditional branching instructions (either macro or micro instructions) that were predicted by the microprocessor to take one path, but in their execution, took another path. In these cases, the machine must discontinue fetching and execution on the predicted path and resume fetching and execution on the correct path.

All in all, exceptions, assists, and branches are only three of a variety of events which can be posted. These events need not directly affect the instruction or microcode control flow. In some cases, they just cause special updates of the macroarchitectural or microarchitectural state of the processor due to a condition detected by the microinstruction.

Without pipelining, the processing of a simple sequence of instructions including a branch instruction may be depicted as shown in Table 1:

TABLE 1

| | | Pipeline Diagram for a Non-Pipelined Processor | | | | | | | | | | | | | | |
|---|---|---|---|---|---|---|---|---|---|---|---|---|---|---|---|---|
| Instruction | | Time (Cycle #) | | | | | | | | | | | | | | |
| # | Operation | 1 | 2 | 3 | 4 | 5 | 6 | 7 | 8 | 9 | 10 | 11 | 12 | 12 | 14 | 15 |
| 100 | Add ... | IF | ID | OF | EX | WB | | | | | | | | | | |
| 101 | Jump 200 | | | | | | IF | ID | OF | EX | WB | | | | | |
| 200 | Add ... | | | | | | | | | | | IF | ID | OF | EX | WB |

In the execution stage, the instruction and the source operand values are sent to an execution unit for execution. During writeback, the result value of the execution is written to the register file at the destination register address obtained during the instruction fetch stage.

In more complex systems, macroinstructions are fetched from memory and translated into one or more microinstructions, which are sequentially placed into the machine by the decoder and executed one at a time (i.e., operand fetch, execute and writeback). The group of microinstructions associated with a macroinstruction is called a flow. Whenever the last microinstruction of a flow has written back, the macroinstruction is said to have completed.

Within the microprocessor, there are two flows of control. One which governs the fetching of instructions (the instruction flow) and one which governs the issue of microinstructions to execute an instruction (microcode control flow). The execution of an instruction, in and of itself, may change the instruction flow, however, this does not necessarily imply a microcode flow change. Conversely, a branch may be executed by microcode to change the microcode control flow without altering the instruction flow. Certain exceptional conditions may be detected during the execution of a microinstruction which cause a microcode control flow change. These conditions are known as events. Events, To improve microprocessor efficiency, microprocessor designers overlap the pipeline stages so that the microprocessor operates on several instructions simultaneously. The instruction sequence of Table 1 may be pipelined as follows so that the execution of instruction 100 occurs at the same time as the fetching of the operands for instruction 101:

TABLE 2

| | | Pipeline Diagram for a Pipelined Processor | | | | | |
|---|---|---|---|---|---|---|---|
| Instruction | | Time (Cycle #) | | | | | |
| # | Operation | 1 | 2 | 3 | 4 | 5 | 6 | 7 |
| 100 | Add ... | IF | ID | OF | EX | WB | | |
| 101 | Jump 200 | | IF | ID | OF | EX | WB | |
| 200 | Add ... | | | IF | ID | OF | EX | WB |

Pipelining improves instruction throughput by overlapping the instruction cycle pipe stages. However, in the case of branch instructions, it may be necessary to fetch the next instruction before it is determined whether the branch instruction is a taken branch or before it is determined whether an exception occurs during execution of the branch instruction. Note that this applies to both instructions and microinstructions. Just as the instruction fetch mechanism speculates on the direction of the branch and continues fetching instructions based on that speculation, so too microinstructions which lie after a conditional microcode branch may be sent into the processor for execution before the branch has been resolved. A microinstruction sequencer speculates on the direction of the microcode branch and continues fetching microinstructions based on that speculation. Note also that the fetching of subsequent instructions or microinstructions may also occur before the processor is able to determine that a preceding instruction or microinstruction generated an event.

For example, in Table 2, the result of the jump instruction at address 101 may not be known until the execution stage of the instruction. Given this, the processor may continue fetching instructions sequentially after 101, as depicted below.

instruction is fetched, the branch target buffer predicts the target address of the branch using the branch history. For a more detailed discussion of branch prediction, please refer to Tse Yu Yeh and Yale N. Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992.

In combination with speculative execution, out-of-order dispatch of instructions to the execution units results in a substantial increase in instruction throughput. With out-of-order completion, any number of instructions are allowed to be in execution in the execution units, up to the total number of pipeline stages in all the functional units. Instructions may

TABLE 3

| Instruction | | Pipeline Diagram for a Pipelined Processor | | | | | | | | |
|---|---|---|---|---|---|---|---|---|---|---|
| | | Time (Cycle #) | | | | | | | | |
| # | Operation | 1 | 2 | 3 | 4 | 5 | 6 | 7 | 8 | 9 | 10 |
| 100 | Add... | IF | ID | OF | EX | WB | | | | | |
| 101 | Jump 200 | | IF | ID | OF | EX | WB | | | | |
| 102 | ... | | | IF | ID | OF | | | | | Flush |
| 103 | ... | | | | | IF | | | | | |
| 200 | Add... | | | | | | IF | ID | OF | EX | WB |

If an exception or a mispredicted branch condition is detected during the execution of instruction 101, then the two subsequent instructions (#102 and #103) were erroneously fetched, and a mechanism must be provided for handling this erroneous fetching, such as flushing or canceling the erroneously fetched instructions. However, this causes a performance penalty in the microprocessor due to the time and resources lost in the fetching and subsequent flushing of the erroneously fetched instructions.

To complicate matters even more, many processors go further than simple pipelining and include superpipelining and/or superscalar operations. Superpipelining increases the granularity of the instruction pipeline; e.g., instead of allocating one clock cycle for instruction execution, two cycles may be employed such that it would take longer for an exception to be detected. A superscalar processor, on the other hand, executes a plurality of instructions per pipeline. The addition of these features to a microprocessor further adds to its performance penalty when an event occurs since more erroneously fetched instructions would have to be flushed from the pipeline.

II. Speculative, Out-Of-Order Processors

In order for pipelined microprocessors to operate efficiently, an instruction fetch unit at the head of the pipeline must continually provide the pipeline with a stream of instructions. However, conditional branch instructions within an instruction stream prevent the instruction fetch unit from fetching subsequent instructions that are known to be correct since the conditions for such instructions are not resolved until execution.

To alleviate this problem, some newer pipelined microprocessors use branch prediction mechanisms that predict the outcome of branches, and then fetch subsequent instructions according to the branch prediction. Branch prediction is achieved using a branch target buffer to store the history of a branch instruction based only upon the instruction pointer or address of that instruction. Every time a branch complete out of order because instruction dispatch is not stalled when a functional unit takes more than one cycle to compute a result. Consequently, a functional unit may complete an instruction after subsequent instructions have already completed. For a detailed explanation of speculative out-of-order execution, please refer to M. Johnson, *Superscalar Microprocessor Design*, Prentice Hall, 1991, Chapters 2,3,4, and 7.

In a processor using out-of-order execution, instruction dispatch is stalled when there is a conflict for a functional unit or when an issued instruction depends on a result that is not yet computed. In order to prevent or mitigate stalls in decoding, the prior art provides for a temporary storage buffer (referred to herein as a dispatch buffer) between the decode and execute stages. The processor decodes instructions and places (or "issues") them into the dispatch buffer as long as there is room in the buffer, and at the same time, examines instructions in the dispatch buffer to find those that can be dispatched to the execution units (i.e., those instructions for which all source operands and the appropriate execution units are available).

Instructions are dispatched from the dispatch buffer to the execution units with little regard for their original program order. However, the capability to issue instructions out-of-order introduces a constraint on register usage. To understand this problem, consider the following pseudomicrocode sequence:

1. t←load (memory)
2. eax←add (eax,t)
3. ebx←add (ebx,eax)
4. eax←mov (2)
5. edx←add (eax,3)

The microinstructions and registers shown above are generic and will be recognized by those familiar with the art as those of the well known Intel Architecture™.

In an out-of-order processor executing these instructions, it is likely that the processor would complete execution of the fourth instruction before the second instruction, because the third ADD instruction may require only one clock cycle, while the load instruction and the immediately following ADD instruction may require a total of four clock cycles, for example. However, if the fourth instruction is executed before the second instruction, then the fourth instruction would probably incorrectly overwrite the first operand of the second instruction, leading to an incorrect result. Instead of the second instruction producing a value that the third instruction would use, the fourth instruction produces a value that would destroy a value that the second one uses.

This type of dependency is called a storage conflict, because the reuse of storage locations (including registers) causes instructions to interfere with one another, even though the conflicting instructions are otherwise independent. Such storage conflicts constrain instruction dispatch and reduce performance.

It is known in the art that storage conflicts can be avoided by using register renaming where additional registers are used to reestablish the correspondence between registers and values. Using register renaming, the additional "physical" registers are associated with the original "logical" registers and values needed by the program. To implement this technique, the processor typically allocates a new register for every new value produced (i.e., for every instruction that writes a register). An instruction identifying the original logical register for the purpose of reading its value obtains instead the value in the newly allocated register. Thus, the hardware renames the original register identifier in the instruction to identify the new register and the correct value. The same register identifier in several different instructions may access different hardware registers depending on the locations of register references with respect to the register assignments.

With renaming, the example instruction sequence depicted above becomes:

1. $t_a \leftarrow$ load (mem)
2. $eax_b \leftarrow$ add $(eax_a, t_a)$
3. $ebx_b \leftarrow$ add $(ebx_a, eax_b)$
4. $eax_c \leftarrow$ mov (2)
5. $edx_a \leftarrow$ add $(eax_c, 3)$ In this sequence, each assignment to a register creates a new instance of the register, denoted by an alphabetic subscript. The creation of a renamed register for eax in the fourth instruction avoids the resource dependency on the second and third instructions, and does not interfere with correctly supplying an operand to the fifth instruction. Renaming allows the fourth instruction to be dispatched immediately, whereas, without renaming, the instruction must be delayed until execution of the second and third instructions. When an instruction is decoded, its result value is assigned a location in a functional storage unit (referred to herein as a reorder buffer), and its destination register number is associated with this location. This renames the destination register to the reorder buffer location. When a subsequent instruction refers to the renamed destination register, in order to obtain the value considered to be stored in the register, the instruction may instead obtain the value stored in the reorder buffer if that value has already been computed.

The use of register renaming in the reorder buffer not only avoids register resource dependencies to permit out-of-order execution, but also plays a key role in speculative execution. If the instruction sequence given above is considered to be part of a predicted branch, then one can see that execution of those instructions using the renamed registers in the reorder buffer has no effect on the actual registers denoted by instruction. Thus, if it is determined that the branch was mispredicted, the results calculated and stored in the reorder buffer may be erased and the pipeline flushed without affecting the actual registers found in the processor's register file. If the predicted branch affected the values in the register file, then it would be difficult to recover from branch misprediction because it would be difficult to determine the values stored in the registers before the predicted branch was taken without the use of redundant registers in the reorder buffer.

When a result is generated by an execution unit, it is written back to the reorder buffer. The result may also provide an input operand to one or more waiting instructions buffered in the dispatch buffer, indicating that the source operand is ready for dispatch to one or more execution units along with the instructions using the operand. After the value is written into the reorder buffer, subsequent instructions continue to fetch the value from the reorder buffer, unless the entry is superseded by a new register assignment and until the value is retired by writing it to the register file.

After the processor determines that the predicted instruction flow is correct, the processor commits the speculative results of those instructions that were stored in the reorder buffer to an architectural state by writing those results to the register file. This process is known as retirement wherein the instructions are architecturally committed or retired according to their original program order (i.e. the original instruction sequence).

III. Event Signaling In Conventional Processors

Depending upon the particular type of event that occurs, a conventional processor, such as the i486™ and Pentium™ processors manufactured by Intel Corporation, will either log the event and update certain pieces of state without affecting the flow of control or abort execution of the microinstruction and all subsequent microinstructions and transfer microcode control to a microcode routine which handles the event. In the latter case, the routine may attempt to continue executing the flow associated with the instruction which caused the event once the condition is handled, or it may perform a system call (in Intel Architecture™ terms, a "far call") to a macrocode routine which handles the condition. In accordance with the Intel Architecture™, a far call is made when a defined exception such as a fault, trap, hardware interrupt or software interrupt occurs.

Generally speaking, the characteristics of a system call operation vary widely based on the mode of the processor. Such characteristics include the number and size of items pushed onto the stack, the method used to obtain a pointer to the system call routine which handles the event, the size and format of the system call routine pointer, and various other checks performed (in fact, this far call may itself cause an event). As a result of these differences, the handler call microcode flow must determine the mode of the processor and select the appropriate microcode flow to perform the system call operation and branch to that flow.

Hence, in order to perform a system call to an event handler in signaling an event, at least two conditional branches must be taken. First, the microinstruction sequencer is instructed either directly by the functional unit through hardware, or indirectly via microcode, to perform a conditional jump to the handler call microcode flow. That is, a jump is requested on the condition that an event needs to be signaled. Second, a conditional microcode jump is then used to select the proper system call routine based upon the state of the microprocessor. It is further noted that assists and other events which do not require a system call may still require different actions that are dependent on the mode of the processor. As a result, they would also require a similar set of conditional branches to reach the appropriate microcode to handle the event.

However, a significant drawback in the method described above is that the required conditional jumps give rise to branch penalties that result in a performance loss for the processor. Because conditional branches are predicted before they are finally determined in the execute stage, the occurrence of a mispredicted branch will require that instructions issued after the conditional jump be flushed from the pipeline, thereby causing a severe performance penalty due to the time lost in fetching the improper instructions and in decoding new instructions subsequent to the flushing. In addition, the use of conditional jumps, whether properly predicted or not, may cause the pipeline to be stalled due to the time required by most processors in evaluating the condition and computing the destination.

Accordingly, it would be advantageous to provide in a processor a mechanism for signaling events that require mode dependent handling actions while minimizing branch penalties by avoiding the mode-dependent conditional branches needed to reach the appropriate microcode handler.

IV. Event Signaling In Speculative, Out-Of-Order Processors

The out-of-order nature of more contemporary processors also presents further problems in the signaling of events in such architectures. With respect to the pipe stages for the processing of instructions in an out-of-order microprocessor, the processor architecture can be functionally broken down into an in-order, front-end section and an out-of-order, back-end section as follows:

IN-ORDER, FRONT-END
1) Instruction Fetching,
2) Instruction Decoding,
3) Register Renaming,
4) Instruction Allocation, OUT-OF-ORDER, BACK-END
5) Instruction Execution,
6) Result Writeback, and
7) Instruction Retirement.

Because the fetch, decode, rename and allocate stages are disjoint from the execute, writeback and retirement stages of the processor, communicating events that occur in the in-order, front-end to the out-of-order, back-end of the processor becomes quite difficult. This is because the decoded instructions are allocated reorder buffer entries only at the boundary between the in-order and out-of-order sections of the processor. Thus, if an event is detected by a front-end functional unit, signaling the event directly to the back-end functional units is prevented since no reorder buffer entry has yet been allocated for the corresponding instruction.

More importantly, events are harder to handle when the execution of instructions is out-of-order. Due to the fact that instructions are issued in-order, executed out-of-order, and retired in-order, an execution unit cannot simply signal an event at writeback and expect it to be handled at that time. This is because events in an out-of-order architecture must be handled precisely; that is, all preceding microinstructions must have executed and retired successfully, while all following microinstructions may have to be canceled. Therefore, it would be desirable to provide a means for communicating to the retirement logic that an event occurred during execution of a microinstruction in addition to a means for storing event related information until the event can be handled by the retirement logic.

Additionally, when a unit detects an event during the execution of a microinstruction, it is possible that that same execution will be called upon later to execute a microinstruction issued prior to the one it is currently executing at a later time. Yet, this second microinstruction could also generate an event. This therefore complicates the operation of the execution unit since it must now figure out for each microinstruction which causes an event whether that microinstruction was issued before or after the previous one which caused the event. Hence, if the one generating the event occurs before the one which previously caused the event, the new event information would also have to be saved.

A further complication is the fact that certain actions, including state information updates, should occur whenever certain classes of events occur. For instance, events which require microcode handlers must have a pointer to the microinstruction which caused the event saved for them. Also, several event types require that various units be signaled as to their occurrence and that various buffers be drained. Thus, aside from the problems associated with communicating events between the front-end and back-end of the processor and providing an appropriate storage means for buffering event related information, some means would also have to be provided for saving and updating appropriate state information.

Accordingly, it is an object of the present invention to provide a method and apparatus for signaling events in a microprocessor via a microinstruction in order to minimize the use of mode-dependent conditional jumps and their attendant branch penalties.

It is another object of the present invention to provide a method and apparatus in an out-of-order microprocessor for signaling microcode detectable events occurring in the in-order, front-end to the out-of-order, back-end of the microprocessor in order to reduce the complexity and expense of implementing dedicated hardware that would otherwise be required for updating the appropriate functional units.

It is a further object of the present invention to provide a method and apparatus for signaling events in an out-of-order microprocessor via a microinstruction which utilizes the architecture of the reorder buffer to post events in the out-of-order, back-end of the microprocessor.

It is yet another object of the present invention to provide a mechanism by which microcode can specify values to be placed in the data, flags, and event fields of a physical destination register located in the reorder buffer via a microinstruction executed by an execution unit after an event has been detected.

SUMMARY OF THE INVENTION

The present invention provides a method and apparatus for signaling the occurrence of an event in a microprocessor via a microinstruction issued to an execution unit upon detection of a condition giving rise to the event. When such a condition is detected by microcode, microcode generates event related information comprising at least an event type value specifying that an event has occurred and the type of event that occurred and a flags and data value specifying characteristic information and data related to the event for use by the microcode routine in handling the event causing condition. This event related information is then signaled to the reorder buffer so that the appropriate event handling actions and state updates may occur, the appropriate functional units may be notified, and so that a posting mechanism embodied in the retirement control circuit of the processor can post the information to microcode for use by an event specific microcode routine in taking any actions required to handle the condition.

In one embodiment, signaling is accomplished by microcode through issuance of a special SIGNAL_EVENT microinstruction from a microcode read only memory into the normal flow of microinstructions being transmitted to the execution units. This SIGNAL_EVENT microinstruction is implemented in a flow of three distinct microinstructions comprising a first microinstruction which specifies assignment of the event type value to a first source input of the SIGNAL_EVENT microinstruction, a second microinstruction which specifies assignment of the flags and data value to a second source input of the SIGNAL_EVENT microinstruction and the SIGNAL_EVENT microinstruction itself which specifies that the values in both its first and second source inputs are to be written to corresponding fields of a destination register representing a specific storage location within the reorder buffer.

Upon renaming of the microinstructions and allocation of corresponding entries in the reservation station and reorder buffer for the three microinstructions, the microinstructions wait their turn in the reservation station for issuance to an available execution unit. In execution of the first two microinstructions, the event type value is written to the first source input of the SIGNAL_EVENT microinstruction, while the flags and data value is written to a second source input of the SIGNAL_EVENT microinstruction. Then upon execution of the SIGNAL_EVENT microinstruction, the first source input value is written to a first field of the storage location of the reorder buffer specified by the destination register, while the second source input value is written to a second field of the storage location of the reorder specified by the destination register.

With the pertinent event related information now buffered in the proper fields of the storage location of the reorder buffer corresponding to the entry assigned to the SIGNAL_EVENT microinstruction, the reorder buffer recognizes the event indicated by the first source input value, performs the required state updates, notifies the appropriate units and, if necessary, invokes the appropriate handler routine in microcode, saving the event related information into a microcode accessible register.

DETAILED DESCRIPTION OF THE INVENTION

The present invention provides a method for signaling the occurrence of an event in a microprocessor through the use of a microinstruction issued to an execution unit upon detection of the event. For purposes of explanation, specific embodiments are set forth in detail to provide a thorough understanding of the present invention. However, it will be apparent to one skilled in the art that the present invention may be practiced with other embodiments and without all the specific details set forth. In other instances, well known elements, devices, circuits, process steps and the like are not set forth in detail in order to avoid unnecessarily obscuring the present invention.

I. SYSTEM BLOCK DIAGRAM

Figure 1A:
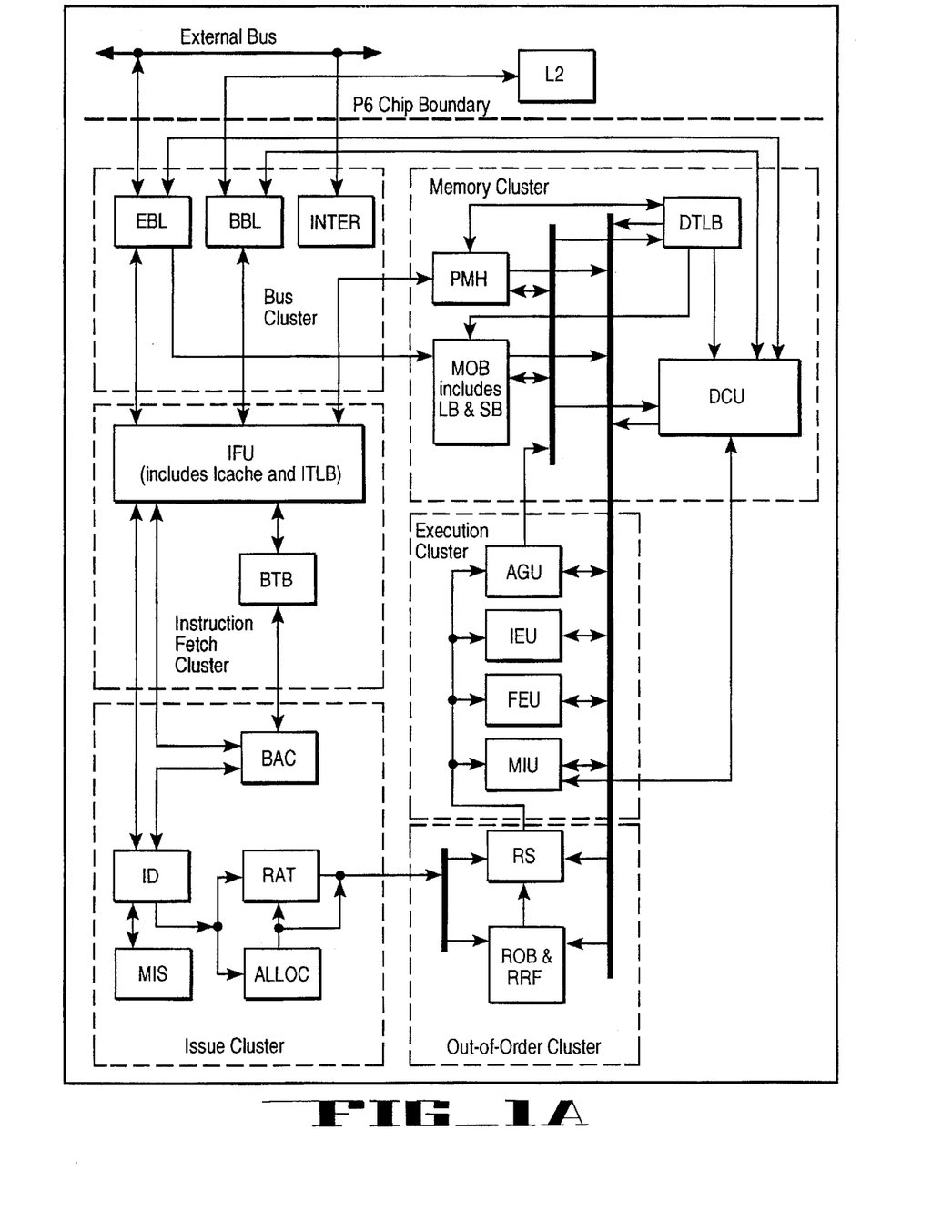
FIG. 1(a) is generalized block diagram of one embodiment of the microprocessor in which the present invention is utilized.

FIG. 1(a) is a generalized block diagram of one embodiment of a speculative, out-of-order data processing device 10 according to the present invention. This particular embodiment includes a variety of functional units grouped together in clusters forming a bus cluster 20, an instruction fetch cluster 30, an issue cluster 40, an out-of-order cluster 70, an execution cluster 60 and a memory cluster 50. In particular, these clusters can be further categorized into an in-order section comprising the bus cluster 20, the instruction fetch cluster 30 and the issue cluster 40, and an out-of-order section comprising the out-of-order cluster 70, the execution cluster 60 and the memory cluster 50.

Figure 1B:
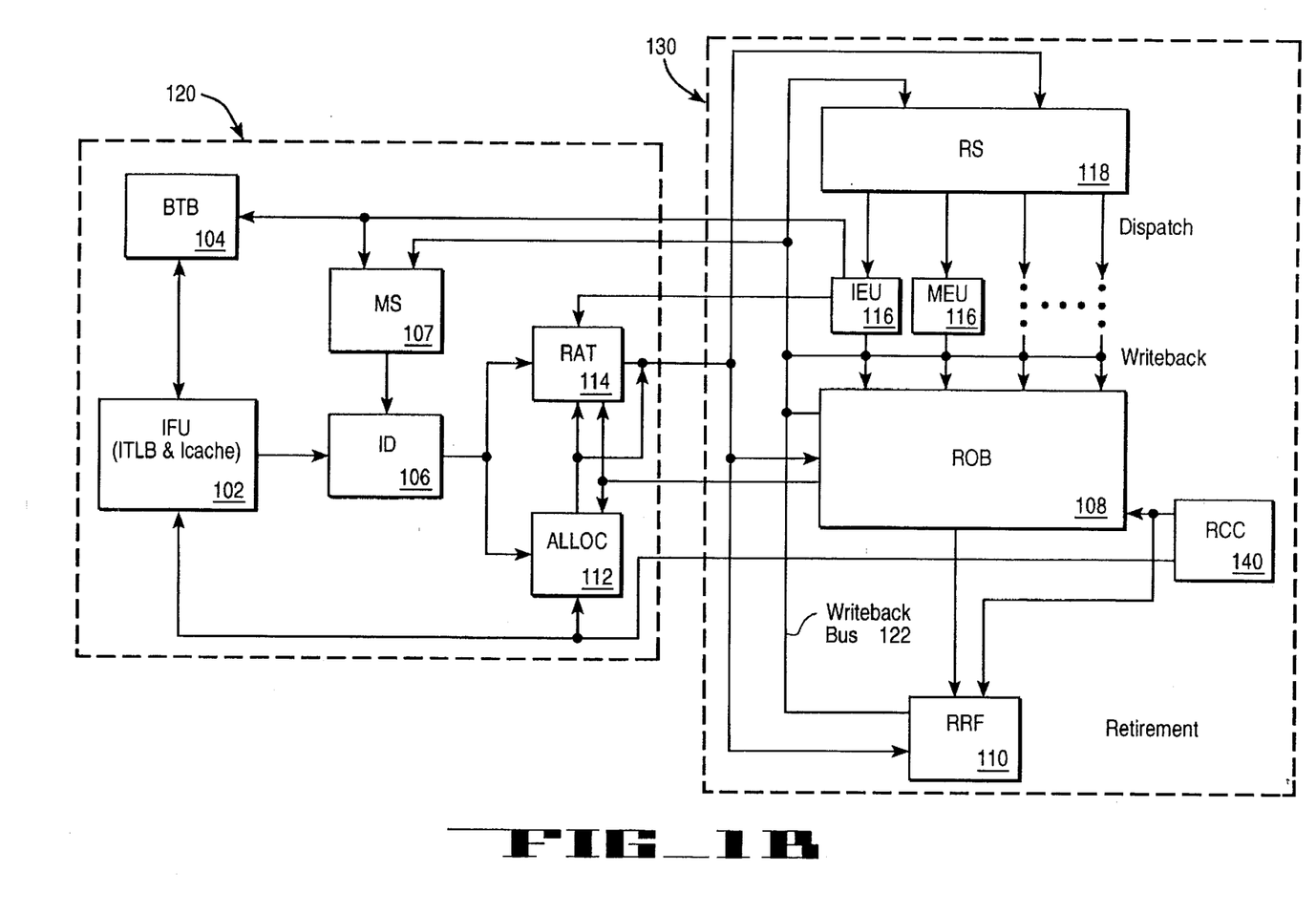
FIG. 1(b) is a block diagram of the microprocessor shown in FIG. 1(a) in which the pertinent in-order, front-end functional units and the out-of-order, back-end functional units are shown.

The functional units and corresponding interconnections pertinent to the description of the present invention are shown in more detail in FIG. 1(b). With reference to FIGS. 1(a) and 1(b), the in-order section (or front-end) of the microprocessor is denoted as 120, while the out-of-order section (or back-end) is denoted as 130. The in-order section 120 includes an instruction fetch unit (IFU) 102 having an instruction cache (ICACHE) and an instruction translation lookaside buffer (ITLB) (neither being shown), a branch target buffer (BTB) 104, and instruction decoder (ID) 106, a microinstruction sequencer (MS) 107, an allocator (ALLOC) 112 and a register alias table (RAT) 114. The out-of-order section 130 includes a reservation station (RS) 118, a number of execution units (EUs) (i.e. an instruction execution unit (IEU) 116 and a memory execution unit (MEU)) 117, a retire control circuit (RCC) 140, a reorder buffer (ROB) 108 and a real register file (RRF) 110.

In the front end 120, the IFU 102 is coupled to the BTB 104 and the ID 106. The BTB 104 provides a predicted linear instruction pointer (IP) to the IFU 102. The ITLB of the IFU 102 maps the linear address pointed to by the IP into a physical address and the IFU 102 fetches macroinstructions from its ICACHE at the location indicated by the physical address.

Each instruction is decoded into one or more microinstructions or operations (uops) by the ID 106 with the help of the MS 107. The MS 107 and ID 106 provides at least one microcode sequence in response to a corresponding uop pointer (uip) that points to the first instruction in the sequence. The MS 107 also implements special microcode sequences for handling events including exceptions and assists, and in one embodiment, emulates the handling routines used by the Intel microprocessor architecture.

The ID 106 transfers the stream of uops to the RAT 114 and the ALLOC 112. In one embodiment, the ID 106 issues up to three in-order uops during each clock cycle of the processor. The ALLOC 112 assigns each incoming uop a location in the ROB 108 in the same order as it was received from the ID 106, thereby mapping the logical destination address (LDST) of each uop to a corresponding physical destination address (PDST) of the ROB 108. The ALLOC 112 maintains an allocation pointer pointing to the next ROB 108 entry to be allocated. The ALLOC 112 also receives a retirement pointer from the RCC 140, indicating which uops stored in the ROB 108 are to be committed to architectural state in the RRF 110. Based upon the received retirement pointer, the ALLOC 112 deallocates retired PDST entries of the ROB 108 to make them available for reallocation.

The RAT 114 maintains the mapping between LDST's and PDST's. To account for retirement, the RAT 114 stores a real register file valid bit (RRFV) that indicates whether the value indicated by the LDST is to be found at the PDST entry of the ROB 108 or in the RRF 110 after retirement. Based upon this mapping, the RAT 114 also associates every logical source address to a corresponding PDST entry of the ROB 108 or the RRF 110 (the source operand of one instruction generally must have been the destination of a previous instruction).

Each incoming uop is also assigned and written into an entry in the RS 118 by the ALLOC 112. The RS 118 assembles the uops awaiting execution by an appropriate EU 116, such as the IEU 116 or MEU 116. When all the source operands of a uop are available and the appropriate EU 116 (specified by an opcode) is ready, the uop is dispatched from the RS 118 to the EU 116 for execution. The EU 116 then writes back result data and any appropriate flags via a writeback bus 122 into flags and data fields of the ROB 108 at the entry indicated by the PDST of the dispatched uop. The EU (e.g., IEU 116 or MEU 117) also writes back into the PDST entry of the ROB 108 event information which indicates whether an event has occurred, and if so, the type and specific nature of the event.

The ROB 108 is implemented as a circular buffer that stores the speculatively executed results of microinstructions written back from the EU's. Once execution has completed and the result data of the uops are determined to be no longer speculative, the uops and their results are committed to architectural state in a process referred to as retirement. Uops stored in the ROB 108 are retired in original program order into the RRF 110 according to a retirement pointer. The retirement pointer is maintained in the RCC 140 and points to all uops for which the processor has determined that the predicted instruction flow is correct. However, for uops which cause an event, they will be retired from the ROB 108 only after the determination is made as to whether to invoke a microcode handler and after any required handling actions are completed.

II. OPERATION OF THE PRESENT INVENTION

As mentioned earlier, events are classified herein as generally comprising any condition that either causes a change in the instruction or microcode control flow (i.e., exceptions, assists and branches) or causes special updates of the macroarchitectural or microarchitectural state of the processor. In other words, an event can be classified as any condition detected by hardware or microcode which requires actions over and above those taken by the normal retirement of an instruction. Although examples are provided herein with regard to events defined by the Intel i486™ instruction set, it is envisioned that other events not defined by this particular instruction set can be signaled by the present invention provided that hardware for recognizing and handling those events once they are signaled is implemented.

According to the present invention, conditions giving rise to events are detected in an out-of-order microprocessor either by microcode or by a functional unit (such as an EU 116, the IFU 102, the ID 106, etc.). When such conditions are detected in microcode (anywhere throughout the microprocessor), microcode signals the events directly to the ROB 108 via microcode only. These include inter alia the detection of privilege violation on privileged instructions (such as invalid moves into a control register, load local descriptor table errors, etc.), self-modifying code conditions, etc. When conditions giving rise to events are detected by a functional unit, the detecting functional unit signals the events to the ROB 108 either through the use of dedicated hardware (i.e., the writeback bus 122) or through the use of microcode depending upon whether the functional unit resides in the back-end or front-end section of the microprocessor, respectively. In example of conditions giving rise to events detected by the front-end units, these include inter alia IFU detected conditions such as ITLB page misses and instruction fetch page faults in addition to ID detected conditions such as device not available faults, invalid opcode faults and general protection faults. In terms of the applicability of the present invention, the invention can be used to signal any event-causing condition that is microcode-detectable or detectable by any functional unit.

Figure 2:
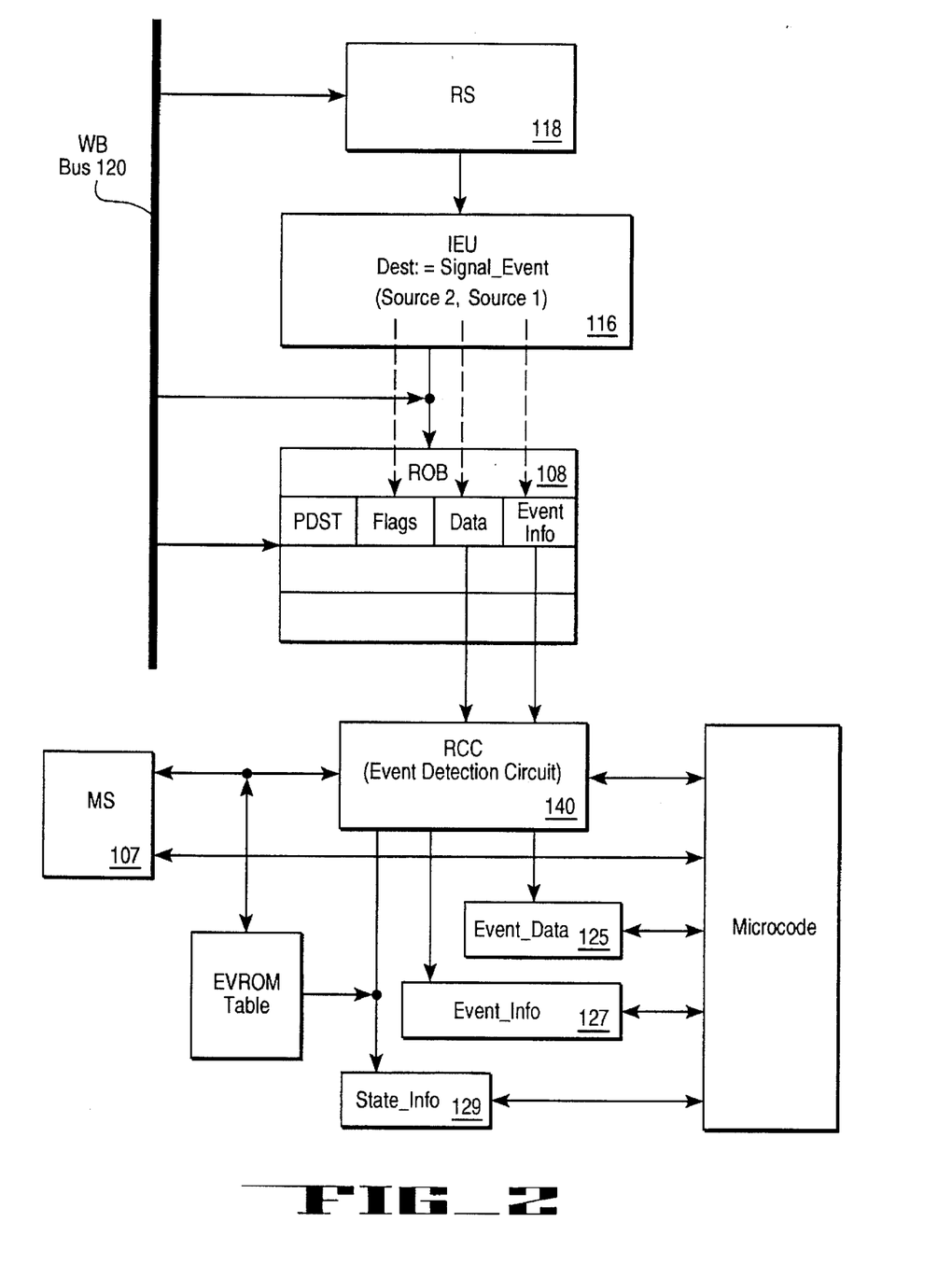
FIG. 2 is a block diagram of the functional units and microcode visible registers used to post events from the reorder buffer to microcode according to the present invention.

In general, signaling is performed by the detecting functional unit or by microcode through the generation and writing of event information into the array fields of the ROB 108. This event information includes inter alia event existence and type information in addition to any event flags and data values provided by microcode or the functional unit detecting the event. As shown in FIG. 2, the fields of the ROB 108 to which this event information is written are:

1) a flags field (FLAGS) which stores data related to the event, such as the architectural event vector which specifies the location of a code selector and an extended instruction pointer (EIP) which point to the particular macroinstruction event handler to be called, 2) a data field (DATA) which stores other event data produced by the functional unit detecting the event, and 3) an event information field (EVENT_INFO) which stores event specific information including an event type indicating the type of event. With respect to the event type, this value may further indicate any special actions that must be taken to handle the event (such as information regarding whether or not a breakpoint was hit or whether an error code is to be pushed in the case of a fault call and, if so, how it is to be generated).

The above-described information is signaled to the ROB 108 via a special instruction referred to as SIGNAL_EVENT, which in the preferred embodiment, is used as shown below.

uop(1): SOURCE1<=event type information
uop(2): SOURCE2<=flags (including exception vector), result data
uop(3): DEST:=SIGNAL_EVENT (SOURCE2, SOURCE1)

The SIGNAL_EVENT instruction (uop(3)) forms the basic operation of the present invention and requires two source data inputs in addition to one destination register. The first source input (SOURCE1) specifies the event type value to be written into the EVENT_INFO field of the ROB 108 corresponding to the PDST entry allocated for the SIGNAL_EVENT uop by the ALLOC 112. This event type value specifies whether an event is to be generated, and if so, what type of event handling action is required. Note that SOURCE1 is allowed to specify that no event handling is required, thereby resulting in this uop being retired and the specified destination register being written with the flags and data value provided by the second source input. The second source input (SOURCE2) specifies a value to be written into the FLAGS and DATA fields of the same PDST entry of the ROB 108, which includes any special information to be associated with the event. Although according to one embodiment, the value specified for SOURCE2 is a register value (since immediate values don't provide flags information), in other embodiments, immediate, constant or memory values may be used for both SOURCE1 and SOURCE2 so as to reduce the flow shown above to one micro-operation. Finally, the destination register (DEST) can be any microcode accessible register in the RRF, but is usually chosen as either an unused register or a special "bit bucket" register provided in the ROB 108 which acts as a repository for unused results of operations.

Upon detection of a condition giving rise to an event by a front-end functional unit or microcode, microcode determines the event type information in addition to the flags and data value described above and writes this information into first and second temporary registers (not shown), respectively. If the event is detected by a front-end functional unit, then the detecting unit requests microcode to issue the flow shown above to an execution unit for execution. If the event is detected in microcode, microcode itself issues the flow at the appropriate place in the current flow of uops to the execution unit. According to the described embodiment, events detected at either the front-end or back-end of an out-of-order processor are signaled by microcode issuing the flow of uops from a uop ROM (UROM) (disposed in the ID) to the RAT 114 and ALLOC 112 where the uops are renamed and allocated locations in both the RS 118 and the ROB 108. If the fetching or decoding of a particular instruction actually caused the event to occur, then the SIGNAL_EVENT flow is issued in place of that instruction.

Next, the uops wait in the RS 118 until their source operands and an EU are available. Once available, the EU takes the operand values, which are preferably stored in a constant ROM, or alternatively, embedded in the uops, and writes them into the SOURCE1 and SOURCE2 registers, respectively. In execution of the SIGNAL_EVENT uop itself, the EU writes the SOURCE1 and SOURCE2 values into the EVENT_INFO, flags and data fields of the PDST entry in ROB 108 allocated for the SIGNAL_EVENT uop. Upon retirement in the ROB 108, the first two uops of the flow are retired as normal (assuming no event occurred in their execution) by writing the results of the uops into the RRF 110 and updating the corresponding pointers. However, when the third uop is retired, the RCC 140 reads the event type value within the EVENT_INFO field of the ROB 108 for the entry and detects that a particular event has occurred.

Upon signaling of the event information to the ROB 108, special support logic in the RCC 140 (referred to as the ROB's posting mechanism) posts the event information to microcode visible registers for use by an invoked event handler in correcting the event if it is determined that a microcode routine needs to be invoked. However, in order to prevent event handling from occurring speculatively, the event is not posted until the uop that caused the event is the oldest uop in the ROB 108 being considered for retirement.

As shown in FIG. 2, when a SIGNAL_EVENT uop is selected for retirement by the RCC 140, the posting mechanism reads the EVENT_INFO field of its PDST entry, detects that an event has occurred and then examines the event type and mode of the processor to determine whether the required event handling actions need to take place now or at the end of the current microcode flow. Next, the posting mechanism either immediately performs the appropriate event handling actions, or alternatively, saves the event information temporarily until the end of the uop flow so that the required actions may be taken when it retires the last uop in the flow.

Depending upon the particular event encountered, the posting mechanism then performs one or more of the following actions: 1) it may signal to the appropriate functional units that an event has occurred, 2) it may update various state information as appropriate, including but not limited to a double fault counter and a temporary copy of DR6 (indicating all data breakpoints hit since the end of the last macroinstruction successfully retired), 3) it may clear the back-end of the processor if required (this may include flushing all pending accesses in the MOB and DCU depending on the event), and 4) it may clear the front-end of the machine if required.

Furthermore, if the event requires microcode intervention, the posting mechanism will do the following:

1) save the extended instruction pointer (EIP) to the current instruction being executed, the micro-operation pointer (UIP) to the micro-operation which caused the event, and the length of the current instruction, 2) write the FLAGS and DATA fields of the PDST entry in ROB 108 for the SIGNAL_EVENT uop to a microcode visible register denoted as EVENT_DATA in addition to writing the EVENT_INFO field of the PDST entry (along with other information about the micro-operation) to a second microcode visible register denoted as EVENT_INFO, 3) examine the event type and mode of the processor, 4) select an event vector to a specific handler for the event from an event ROM (EVROM) table based on the event type and processor mode, and 5) instruct the MS 107 to begin sequencing microcode (forming the event handler) at the location in microcode ROM (UROM) specified by the event vector. Finally, after all this has been done, the invoked event handler then reads the microcode visible registers to obtain the event information which it needs to properly handle the event.

For more detail on the above-described posting mechanism, the reader is directed to co-pending U.S. patent application Ser. No. 08/160,495 filed on Dec. 1, 1993 and entitled Exception Handling In A Processor That Performs Speculative Out-Of-Order Instruction Execution.

In comparison with conventional microprocessor architectures, the SIGNAL_EVENT instruction in conjunction with the event posting mechanism described above significantly increase system performance since events can be posted without executing the second mode-dependent conditional branch normally needed to properly handle an event. In accordance with conventional architectures, the ROB 108 would likely have to generate a pointer to a handler based solely on the event type, relying on microcode to examine the mode and determine the proper routine to handle the event. However, according to the implementation of the ROB 108 described above, the ROB 108 is able to select the appropriate routine from the EVROM look-up table by combining the processor's current mode (i.e., Real Mode, Protected Mode, VME Mode, Virtual-8086 Mode, etc.) and event type information (i.e., fault, trap, software event, hardware event, etc.), thereby eliminating conditional branches based on the mode of the processor.

In an alternate embodiment of the present invention, the SIGNAL_EVENT instruction is used in combination with a conditional data select instruction in order to conditionally cause an event to occur depending upon the event type value placed in its SOURCE1 field. This is a very useful feature for when microcode must check either the state of the processor or data being used by an instruction and fault based on the value of the data.

For example, consider the flow for a Intel Architecture™ MOV CR0, EAX instruction. According to the instruction description, this operation must generate a general protection fault whose fault call pushes a 0 error code onto the stack if the current privilege level (CPL) of the processor is not 0. In past implementations, microcode would check CPL to determine whether CPL=0. If it was found that CPL=0, a conditional branch would be used to reach the fault handler call microcode flow which would have to perform all the actions associated with posting a fault, including determining the mode of the processor in order to determine how to perform the far call to the handler. Yet, the required conditional jump to the fault call microcode would most probably be mispredicted since the microcode would be optimized for the non-faulting case, thereby incurring a significant performance penalty.

However, much of the work that would be done by microcode in a conventional architecture for the above example can be avoided by combining the SIGNAL_EVENT operations with a conditional data select instruction using the following four uops:

uop(1):TMP<=COMPARE(CPL, 0)
uop(2):SOURCE2<=MERGE_FLAGS_DATA(13,0)
uop(3):SOURCE1<=SELECT_NZ(POST_FAULT_WITH_ZERO_ERROR_CODE, NO_EVENT)
uop(4):SINK<=SIGNAL_EVENT(SOURCE2, SOURCE1)

The first uop checks to see if CPL=0. The second uop places the architectural vector for general protection faults (13) into the flags field of the SOURCE2 input and places a 0 in the data field of the SOURCE2 input. This is done because, according to the described embodiment, any fault event posted must provide the architectural vector in the FLAGS field of the PDST entry of the ROB 108 for the SIGNAL_EVENT uop. This is required so that the flags field of the EVENT_DATA register contains the vector for the fault handler call microcode to use in performing the far call.

The third uop is used to select the value to be placed in the EVENT_INFO field of the same PDST entry of the ROB 108. If the comparison performed by uop(1) indicated that CPL≠0, then the SELECT uop would select the first value (POST_FAULT) which causes a fault event to be signaled and a zero error code to be pushed onto the stack by the fault handler call microcode. If the comparison indicated that CPL=0, then the SELECT uop would select the second value (NO_EVENT) indicating that no event is to be signaled.

These two source values are then passed to the SIGNAL_EVENT uop, which causes the EU which executes this uop to write the selected SOURCE1 value, the SOURCE2 flags value and the SOURCE2 data value into the EVENT_INFO field, the FLAGS field and the DATA field of the uop's PDST entry of the ROB 108, respectively. If the POST_FAULT value was chosen by the SELECT uop, the ROB 108 would perform all the required actions associated with handling a fault event when it retires the PDST entry for the SIGNAL_EVENT uop. This includes examining the mode of the processor, selecting the appropriate fault handler call microcode flow based on the mode, and instructing the MS 107 to begin execution of microcode at that address. If the SELECT uop selected the NO_EVENT value, the ROB 108 would retire the PDST entry for the SIGNAL_EVENT uop without posting an event and write the SOURCE2 flags and data value into the SINK register. Since the SINK register in this case is a bitbucket register, the values written to this register would then be discarded.

This flow has therefore conditionally signaled a fault based on whether or not CPL=0. Similar sequences can be used to conditionally post an event based on any number of conditions provided that the condition is capable of setting a flag indicating whether or not the condition is valid. Note also that the fault call handler in the above-example was reached without the use of a mode-dependent conditional branch.

III. COMPUTER SYSTEM

Figure 3:
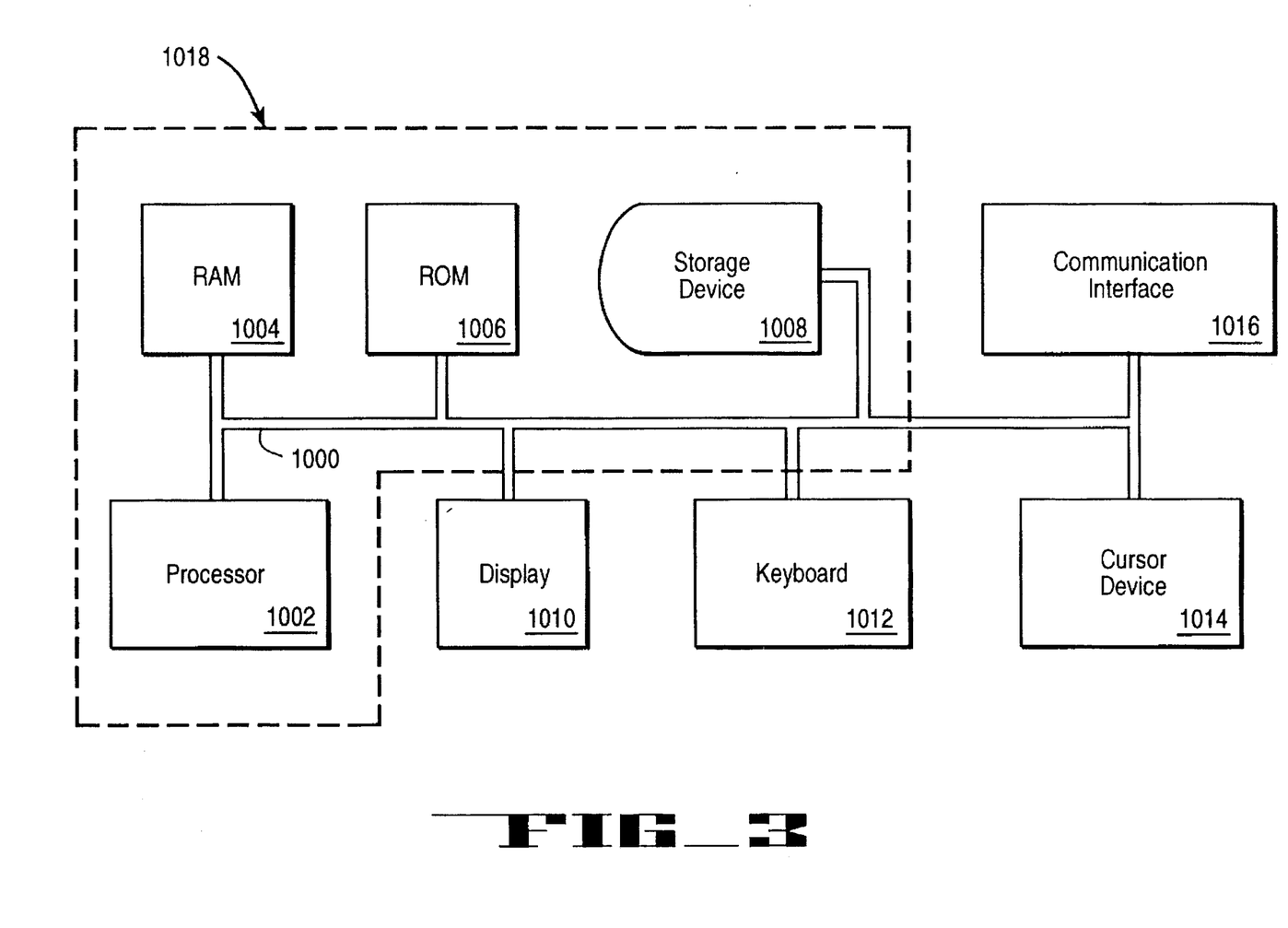
FIG. 3 is a block diagram of one embodiment of a computer system in which the out-of-order microprocessor of the present invention may be implemented.

The microprocessor of the present invention may be incorporated into a general purpose computer system as shown in FIG. 3. Generally the computer system of the present invention comprises an address/data bus 1000 for communicating information, a central processor 1002 coupled with the bus for processing information and executing instructions, a random access memory 1004 coupled with the bus 1000 for storing information and instructions for the central processor 1002, and a read only memory 1006 coupled with the bus 1000 for storing static information and instructions for the processor 1002. Also available for interface with the computer system of the present invention is a data storage device 1008 such as a magnetic disk or optical disk drive, which may be communicatively coupled with the bus 1000, for storing data and instructions.

The display device 1010 utilized with the computer system of the present invention may be a liquid crystal device, cathode ray tube, or other display device suitable for creating graphic images and/or alphanumeric characters recognizable to the user. The computer system may also contain an alphanumeric input device 1012 including alphanumeric and function keys coupled to the bus 1000 for communicating information and command selections to the central processor 1002, and a cursor control device 1014 coupled to the bus 1000 for communicating user input information and command selections to the central processor 1002 based on a user's hand movement.

The computer system of FIG. 3 also contains an input/output device 1016 coupled to the bus 1000 for communicating information to and from the commuter system. The communication device 1016 may be composed of a serial or parallel communication port or may be a communication modem. It is appreciated that such a communication device 1016 may provide an interface between the bus 1000 and the user interface devices (keyboard 1012, cursor 1014, display 1010) of the computer system. In this case, the user interface devices will reside within a terminal device which is coupled to the communication device 1016 so that the processor 1002, the RAM 1004, the ROM 1006 and storage device 1008 may communicate with the terminal. The components 1002, 1004, 1006 and 1008 may be implemented on a single board or a computer chassis 1018, which is then coupled by a bus 1000 to the other components of the computer system.

It will be appreciated that various modifications and alterations might be made by those skilled in the art without departing from the spirit and scope of the present invention. For example, the use of the Intel architecture and i486™ instruction set by the present invention is but one implementation. The present invention applies to other processor designs and instruction sets as well. Further, the present invention may be physically implemented in a variety of packages. The present invention may be built into one integrated circuit package or have its functionality spread over a number of chips, or be implemented by an emulator. Moreover, the invention may be constructed on chips of different materials, such as silicon or gallium arsenide.

Finally, although the present invention allows speculative, out-of-order execution and is superscalar, aspects of the present invention operate effectively within both simple and more complex pipelined processors that perform neither speculative execution, out-of-order execution, nor superscalar operation. Therefore, the invention should be measured in terms of the claims which follow.

We claim:

1. In a processor which executes a flow of instructions, the processor including an execution unit, a buffer which holds results produced by the execution unit, and logic for handling events that occur in the processor, wherein events comprise conditions that cause either a change in the flow of instructions or an update of an architectural state of the processor, a method for signaling an event comprising the steps of:

(a) detecting a condition that gives rise to a particular event;

(b) writing information associated to the particular event to one or more registers;

(c) issuing a special instruction into the flow of instructions, the special instruction having as source inputs the information in the one or more registers;

(d) executing the special instruction in the execution unit by writing the information specified by the source inputs into the buffer; and (e) posting the information associated with the particular event to at least one register.

2. The method according to claim 1 wherein step (e) occurs after a last micro-operation in the flow of instructions has been retired.

3. The method according to claim 1 wherein step (e) comprising the step:

signaling to an associated functional unit of the processor that the particular event occurred.

4. The method according to claim 1 wherein step (e) comprises the step:

updating state information resulting from a most recently retired instruction.

5. The method according to claim 1 wherein step (e) comprises the step of:

flushing pending accesses to a data cache unit of the processor.

6. The method according to claim 1 further comprising the step of:

(f) handling the particular event by invoking a coded routine.

7. The method according to claim 1 wherein step (a) is performed by a functional unit of the processor.

8. The method according to claim 1 wherein step (a) is performed by microcode.

9. The method according to claims 1, 2, 3, 4, 5, 6, 7 or 8, wherein the information associated with the particular event includes an event type value, a flags value, and a data value.

10. In a processor which executes a flow of instructions, the processor including an execution unit, a buffer holding results produced by the execution unit, and logic for handling events that occur in the processor, wherein events comprise conditions that cause either a change in either the flow of instructions or an update of an architectural state of the processor, a method for combining micro-operations associated with first and second instructions to cause a particular event to occur, the method comprising the steps of:

(a) determining that a condition giving rise to the particular event exists;

(b) placing an architectural vector into a first field of a first source input of the first instruction;

(c) placing a data value associated with the particular event into a second field of the first source input;

(d) conditionally selecting an event type value to be placed into a field of a second source input of the first instruction;

(e) executing a micro-operation of the first instruction in the execution unit to write the first and second source inputs into corresponding fields of an entry in the buffer; and (f) posting the particular event.

11. The method according to claim 10 further comprising the step of:

(g) executing a fault handler microcode flow in response to step (f).

12. The method according to claim 11 wherein step (g) occurs after retirement of the micro-operation executed in step (e).

13. The method according to claim 12 wherein the buffer comprises a reorder buffer.

14. A microprocessor which executes a flow of instructions comprising:

an execution unit;

a decoder which decodes an instruction specifying that a particular event be posted dependent upon the existence of a condition which causes either the change in the flow of instructions or an update of an architectural state of the processor;

means for detecting the condition giving rise to the particular event;

a buffer, execution of a micro-operation specified by the instruction causing the execution unit to write event information associated with the instruction to an entry of the buffer;

a retirement mechanism coupled to the buffer which selects the microoperation for retirement;

an event posting mechanism coupled to the buffer and a retirement mechanism, the event posting mechanism conditionally posting the particular event to at least one register when the micro-operation is selected for retirement.

15. The microprocessor of claim 14 wherein the event information includes source value information for the instruction, the source value information including the event type value, posting of the particular event being dependent upon the event-type value.

16. The microprocessor of claim 15 further comprising an event handler coupled to the event posting mechanism, the event handler being invoked by the event posting mechanism responsive to the particular event.

* * * * *